United States Patent
Muniswamy Reddy et al.

(10) Patent No.: US 9,898,614 B1
(45) Date of Patent: Feb. 20, 2018

(54) IMPLICIT PRIORITIZATION TO RATE-LIMIT SECONDARY INDEX CREATION FOR AN ONLINE TABLE

(71) Applicant: Amazon Technologies, Inc., Seattle, WA (US)

(72) Inventors: Kiran Kumar Muniswamy Reddy, Sammamish, WA (US); Wei Xiao, Bellevue, WA (US); Adam Douglas Morley, Seattle, WA (US); Lokendra Singh Panwar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/859,072

(22) Filed: Sep. 18, 2015

(51) Int. Cl.
*G06F 21/62* (2013.01)
*G06F 17/30* (2006.01)
*H04L 12/26* (2006.01)
*H04L 12/819* (2013.01)

(52) U.S. Cl.
CPC ........ *G06F 21/62* (2013.01); *G06F 17/30321* (2013.01); *H04L 43/0876* (2013.01); *H04L 47/215* (2013.01)

(58) Field of Classification Search
CPC .............. G06F 21/62; G06F 17/30321; H04L 43/0876; H04L 47/215
See application file for complete search history.

(56) References Cited

U.S. PATENT DOCUMENTS

| | | | | |
|---|---|---|---|---|
| 5,548,770 A | * | 8/1996 | Bridges | G06F 17/30445 |
| 6,112,209 A | * | 8/2000 | Gusack | G06F 17/30321 |
| 6,870,812 B1 | * | 3/2005 | Kloth | H04L 45/7453 370/235 |
| 7,373,241 B2 | * | 5/2008 | Bauerle | F02D 11/105 123/399 |
| 8,504,691 B1 | * | 8/2013 | Tobler | H04L 67/02 370/229 |

(Continued)

OTHER PUBLICATIONS

Kim, Je-Min, and Jin-Soo Kim. "Androbench: Benchmarking the storage performance of android-based mobile devices." Frontiers in Computer Education. Springer Berlin Heidelberg, 2012. 667-674.*
Narasayya, Vivek R., et al. "SQLVM: Performance Isolation in Multi-Tenant Relational Database-as-a-Service." CIDR. 2013.*
Kavalanekar, Swaroop, et al. "Measuring database performance in online services: a trace-based approach." Technology Conference on Performance Evaluation and Benchmarking. Springer Berlin Heidelberg, 2009.*

(Continued)

*Primary Examiner* — Chau Le
(74) *Attorney, Agent, or Firm* — Robert C. Kowert; Meyertons, Hood, Kivlin, Kowert & Goetzel, P.C.

(57) ABSTRACT

A data storage system may implement implicit prioritization to rate-limit secondary index creation for an online table. A secondary index may be generated for a table stored in a data store. The table may be incrementally indexed, performing multiple indexing operations to populate the secondary index. Prior to performing an indexing operation, an evaluation of a capacity limitation for performing indexing operations may be made with respect to capacity to process access requests at the data store. If a determination is made that performance of the indexing operation exceeds the capacity limitation, then the indexing operation may be throttled. If a determination is made that performance of the indexing operation does not exceed the capacity limitation, then the indexing operation may be performed.

20 Claims, 9 Drawing Sheets

(56) References Cited

U.S. PATENT DOCUMENTS

| | | | |
|---|---|---|---|
| 8,837,285 B2* | 9/2014 | Sammour | H04W 36/02 370/230.1 |
| 9,239,874 B1* | 1/2016 | Madany | G06F 17/30613 |
| 9,385,956 B2* | 7/2016 | Xiao | H04L 47/12 |
| 9,430,156 B1* | 8/2016 | Shilane | G06F 3/0611 |
| 9,471,500 B2* | 10/2016 | Kruus | G06F 12/0871 |
| 2005/0160108 A1* | 7/2005 | Charlet | G06F 17/30595 |
| 2006/0080345 A1* | 4/2006 | Murthy | G06F 17/2205 |
| 2007/0112795 A1* | 5/2007 | Travison, Jr. | G06F 17/30327 |
| 2010/0138456 A1* | 6/2010 | Aghili | G06F 17/3033 707/803 |
| 2011/0035205 A1* | 2/2011 | Brideson | G06F 8/35 703/22 |
| 2011/0264668 A1* | 10/2011 | Hacker | G06F 17/30312 707/746 |
| 2012/0330954 A1* | 12/2012 | Sivasubramanian | G06F 9/5061 707/737 |
| 2013/0110845 A1* | 5/2013 | Dua | G06F 17/30424 707/741 |
| 2013/0332610 A1* | 12/2013 | Beveridge | G06F 9/4445 709/226 |
| 2014/0046917 A1* | 2/2014 | Smith | G06F 17/30321 707/696 |
| 2014/0112147 A1* | 4/2014 | Esposito | H04L 47/215 370/235.1 |
| 2014/0195720 A1* | 7/2014 | Akella | G06F 17/30067 711/103 |
| 2014/0196048 A1* | 7/2014 | Mathur | G06F 9/485 718/104 |
| 2014/0279855 A1 | 9/2014 | Tan et al. | |

OTHER PUBLICATIONS

Bose, Sharada, et al. "Benchmarking database performance in a virtual environment." Technology Conference on Performance Evaluation and Benchmarking. Springer Berlin Heidelberg, 2009.*

Kallman, Robert, et al. "H-store: a high-performance, distributed main memory transaction processing system." Proceedings of the VLDB Endowment 1.2 (2008): 1496-1499.*

Lee, Taerim, et al. "Implementation and performance of distributed text processing system using hadoop for e-discovery cloud service." Journal of Internet Services and Information Security (JISIS) 4.1 (2013): 12-24.*

Chalkiadaki, Maria, and Kostas Magoutis. "Managing service performance in nosql distributed storage systems." Proceedings of the 7th workshop on middleware for next generation internet computing. ACM, 2012.*

"Global Secondary Indexes—Amazon DynamoDB", Retrieved from URL: http://docs.aws.amazon.com/amazondynamodb/latest/developerguide/GSI.html on Jul. 2, 2016, pp. 1-9.

U.S. Appl. No. 14/859,059, filed Sep. 18, 2015, Kiran Kimar Muniswamy Reddy et al.

U.S. Appl. No. 14/859,075, filed Sep. 18, 2015, Aanchal Gupta et al.

U.S. Appl. No. 14/859,062, filed Sep. 18, 2015, Wei Xiao et al.

U.S. Appl. No. 14/858,360, filed Sep. 18, 2015, Aanchal Gupta et al.

U.S. Appl. No. 14/859,055, filed Sep. 18, 2015, Kiran Kumar Muniswamy Reddy, et al.

U.S. Appl. No. 14/859,069, filed Sep. 18, 2015, Kiran Kumar Muniswamy Reddy et al.

* cited by examiner

US 9,898,614 B1

IMPLICIT PRIORITIZATION TO RATE-LIMIT SECONDARY INDEX CREATION FOR AN ONLINE TABLE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

Figure 1:
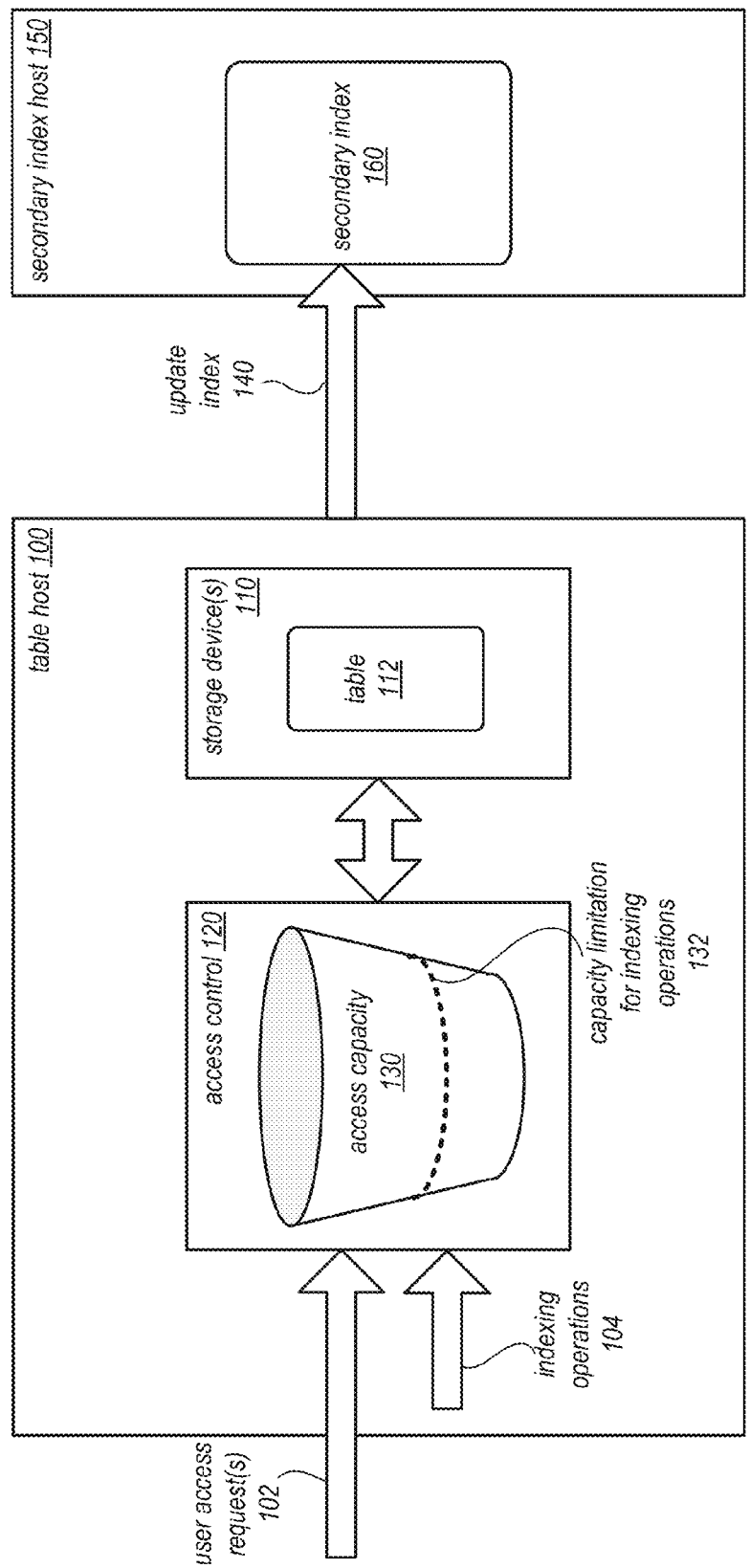
FIG. 1 is a logical block diagram illustrating implicit prioritization to rate-limit secondary index creation for an online table, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement implicit prioritization to rate-limit secondary index generation for an online table. Data stores offer accessible and scalable storage to one or more multiple different clients. Tables of items (which may include one or more data values or attributes) may be stored, managed and accessed at a data store. Different types of data stores exist. Relational data stores may be implemented which organize and maintain data according to a relational scheme (e.g., a common set of data fields for an entry in a table). Non-relational data stores may be implemented which organize and maintain data according to a key value pair which uniquely identifies an item in the table. Key value pairs, or other indexing schemes (which may also be implemented in relational data stores) may allow for fast throughput to update data in items or store new items. However, in some scenarios, locating items that have particular attributes may be resource intensive. For instance, if a non-relational data store is only searchable by key value pair, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a relational or non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above, (which may be very costly in the case of a non-relational data store). Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternative access capabilities to data, creating the secondary index may be a long running operation. Continuing to allow access to a table for which a secondary index is being created may create contention between user request processing to access the table and processing operations to generate the secondary index. Storage devices or other components with limited processing bandwidth implicated in processing access requests to the table may become constrained by too many operations. As user access requests have guaranteed or expected performance characteristics, implicit prioritization may be implemented so that index generation may be rate-limited so that performance guarantees for user access requests are met.

FIG. 1 is a logical block diagram illustrating implicit prioritization to rate-limit secondary index creation for an online table, according to some embodiments. Table host 100 may be a storage node, server, or other computing device (e.g., system 1000 in FIG. 9) that stores part (e.g., a partition) or all of a table 110 for a data store. Secondary index host 150 may be a storage node, server, or other computing device (e.g., system 1000 in FIG. 9) that stores part (e.g., a partition) or all of a secondary index 160 created for the table 110 in the data store.

Table host 100 may implement a table access control 120 which may determine whether an access to data store for a table proceeds. In at least some embodiments, access capacity 130 may be utilized to rate-limit the performance of lower priority requests without explicitly implementing a request priority scheme. For instance, access capacity 130 may be the total capacity host 100 to provide access to data in storage device(s) 110. Storage device(s) 110 may be one or more persistent storage devices, such as block-based persistent storage devices including, but not limited to, hard disk storage, solid state storage, or other types of persistent storage devices. Storage device(s) 110 may store a portion or all of table 112 (e.g., a partition of table 112 or the entire table 112). Some types of access requests to storage device(s) 110, such as user access requests 102, may have provisioned or committed throughput capacity. For example, provisioned capacity for user access requests may be 200 Input/Output Operations per Second (IOPS). This provisioned or committed capacity is served out of the total access capacity 130 of persistent storage device(s).

Other operations may access storage device(s) 110 to perform various background tasks or operations which may or may not be user instigated. Indexing operations 104, for example, to generate secondary index 160 may also access storage device(s) 110 to index table 112. An indexing operation may be performed to read an item from table 112 to determine which items in table 112 should be included in secondary index 160. A capacity limitation may be imposed upon indexing operations 132, in various embodiments, that limits the amount of available capacity 130 that indexing operations may consume (e.g., 100 IOPS). Prior to performing an indexing operation 104, an evaluation of the capacity limitation may be made for performing the indexing operation with respect to the access capacity 130. If available capacity exists 130 and it is within the capacity limitation 132, then the access control 120 may allow the access to table data for the indexing operation. If no available capacity 130 exists, or no capacity 132 within the capacity limitation exists, then the indexing operation may be throttled (e.g., delayed and attempted again at a later time). Limiting the maximum amount of capacity according to capacity limitation 132 may implicitly prioritize the performance of those operations which are not limited, such as user access requests 102. In at least some embodiments, the utilization of capacity may be accounted by access tokens buckets (as discussed below regard to FIGS. 4, 7 and 8).

Please note that previous descriptions are not intended to be limiting, but are merely provided as logical examples of implicit prioritization to rate-limit secondary index creation for an online table.

This specification begins with a general description of storage service implementing a network-based data store that may also implement implicit prioritization to rate-limit secondary index creation for an online table. Then various examples of the storage service are discussed, including different components/modules, or arrangements of components/module, that may be employed as part of implementing the storage service. A number of different methods and techniques to implement implicit prioritization to rate-limit secondary index creation for an online table are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
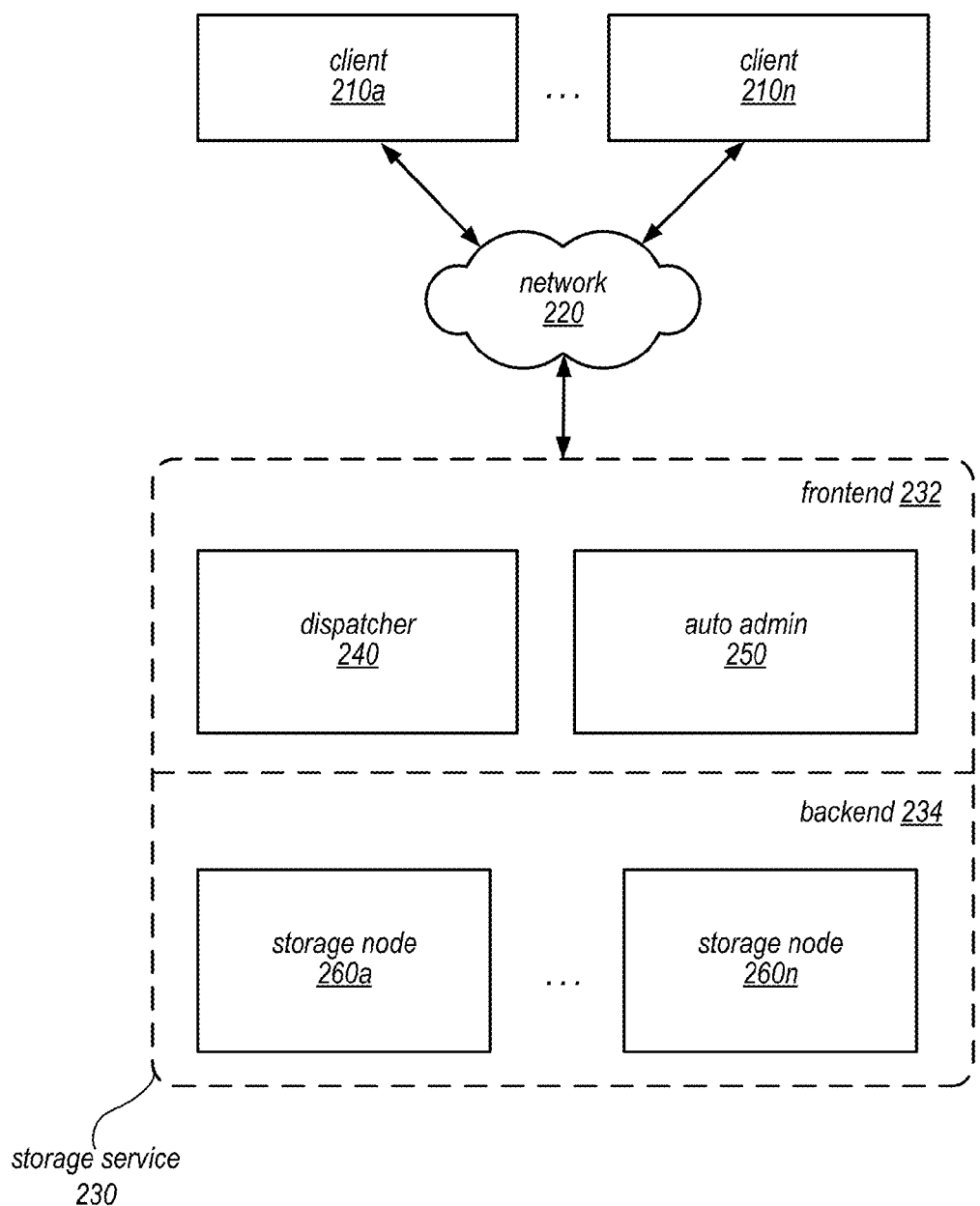
FIG. 2 is a block diagram illustrating a storage service that implements implicit prioritization to rate-limit secondary index creation for an online table, according to some embodiments.

FIG. 2 is a block diagram illustrating a storage service that implements implicit prioritization to rate-limit secondary index creation for an online table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 9 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 2, network-based storage service 230 may include a dispatcher 240 (which may be configured to receive, authenticate, parse, throttle and/or dispatch service requests, among other things), one or more administrative components, or auto admin instances, 250 (which may be configured to provide a variety of visibility and/or control functions, as described in more detail herein) which may be implemented as part of frontend 232. Storage service 230 may also implement a plurality of storage node instances (shown as 260a-260n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 230 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 260a-260n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time (e.g., IOPS), and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
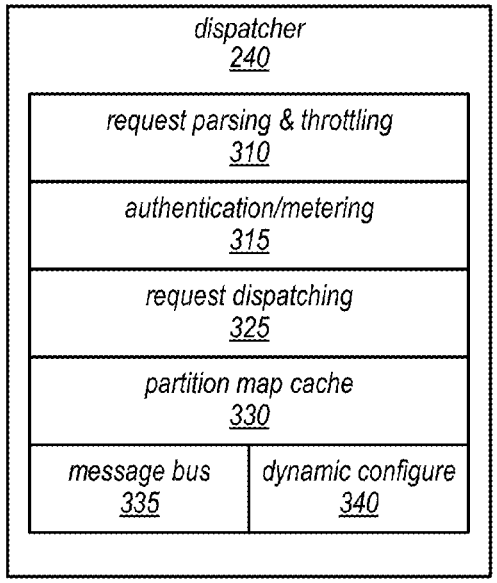
FIGS. 3A-3C are block diagrams illustrating various components of a storage service, according to some embodiments.
Figure 3B:
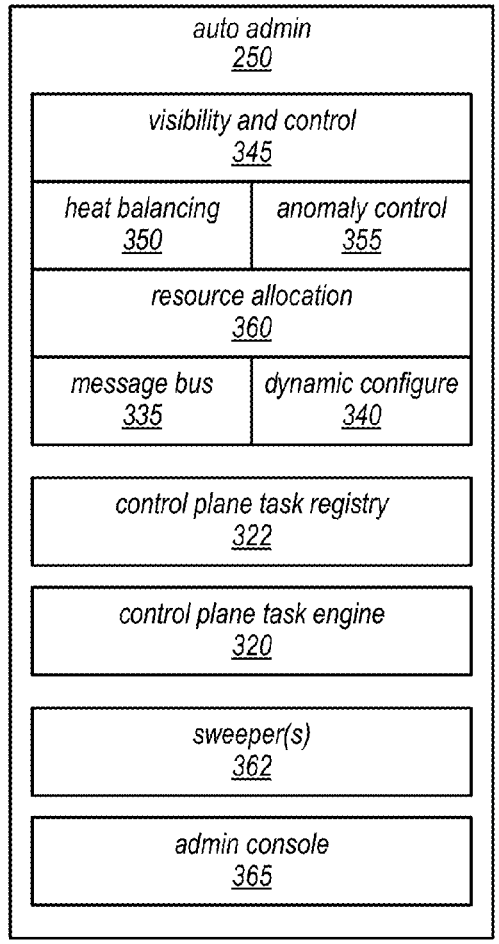
Figure 3C:
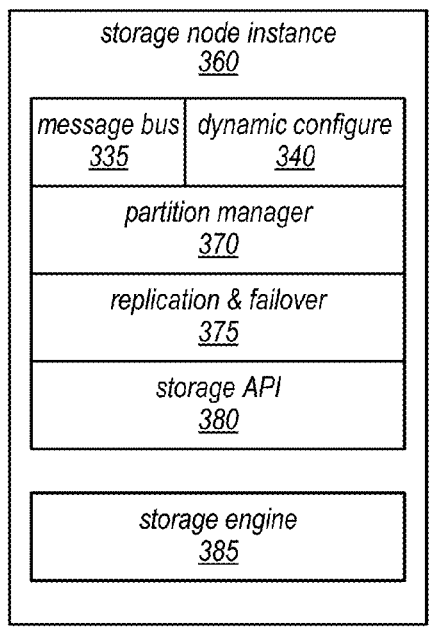

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, and any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380). Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or to create a secondary index for a table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
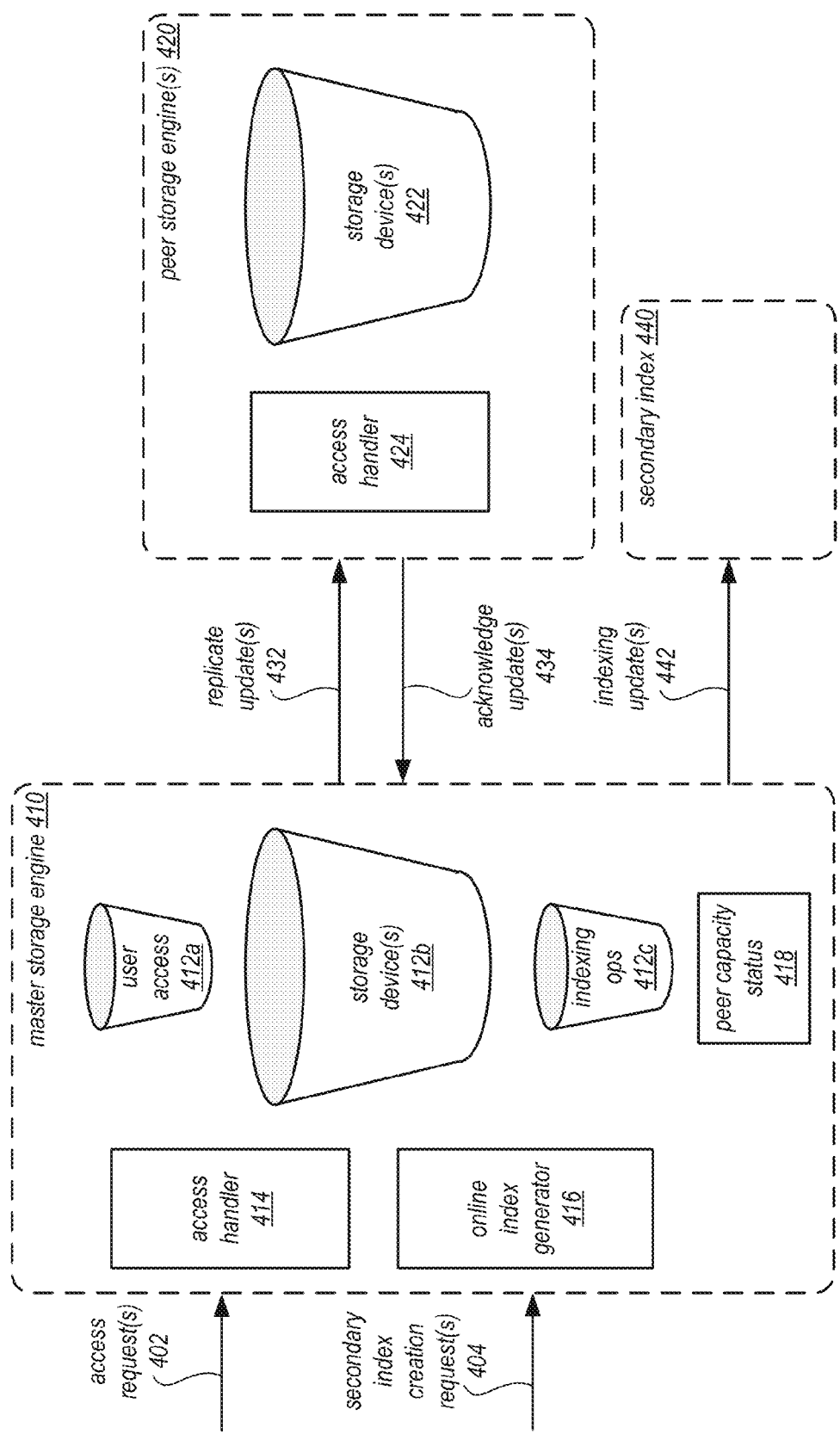
FIG. 4 is a logical block diagram illustrating a replica group for a table that implements implicit prioritization to rate-limit secondary index creation for an online table, according to some embodiments.

As noted above, a table may be stored in multiple partitions at different storage nodes or hosts. Storage engines at the respective storage hosts, such as storage engine 385 in FIG. 3, may be configured to perform incremental indexing of tables to create a secondary index and may impose rate-limiting upon the indexing. FIG. 4 is a logical block diagram illustrating a replica group for a table that implements implicit prioritization to rate-limit secondary index creation for an online table, according to some embodiments.

Multiple storage nodes may store a partition of a table. As illustrated in FIG. 4, the storage engines for the storage nodes, master storage engine 410 for a master replica of a table partition stored in a replica group that includes peer replica(s), which may implement peer storage engine(s) 420. Master replica storage engine 410 may handle access request(s) 402 from users to access data in the partition of the table at the master replica. Note that although not illustrated, request dispatcher 240 may send some read access requests to peer replica(s). Master storage engine 410 may also receive the request 404 to create the secondary index for the table which includes indexing the partition of the table hosted by the replica group.

Access handler 414 may be implemented at master storage engine 410 (and access handler 424 at peer storage engine(s) 420) to process access requests to a table undergoing index creation. Some requests (e.g., to update portions of the table that have not been indexed) may be applied by access handler 414 to the table without further processing. For those updates that are updating previously indexed portions of the table, access handler 414 may replicate the update to secondary index as part of indexing update(s) 442. Access handler 414 may provide provisioned or committed throughput levels for handling access requests 402. User access token bucket 412a may be implemented to provide a guaranteed minimum number of user access requests which may be processed for a given time period. For instance, 500 IOPS may be provisioned for user requests, therefore user access token bucket 412a may refill to 500 tokens every second. Access handler 414 may deduct tokens from user access token bucket 412a when an access request is performed and deduct a token from storage device(s) bucket 412b which indicates the total capacity of one or more storage devices to provide access to data store at the storage devices (including data for the partition of the table). Note that access handler 414 may throttle, deny, or allow access requests when user access token bucket 412a is empty. Moreover, if a token is available in user access token bucket 412a, then access handler 414 may perform the user access request whether or not a token remains in partition storage device bucket 412b (as the user access token bucket is a minimum performance guarantee).

Storage device(s) bucket 412b may provide access tokens for performing an I/O operation to the storage device(s). Thus, in addition to access request(s) 402 for the partition of the table managed by master storage engine 410, other user requests for other tables and other background operations may also obtain tokens from storage device(s) bucket 412b in order to perform an I/O operation. The storage device(s) bucket 412b may be refilled according to the capacity of the storage device to process access requests in a time period (e.g., 1500 tokens every second for 1500 IOPS capability). In some embodiments, individual storage device buckets 412b may be maintained for each storage device, and thus the capacity limitation for performing indexing operations as discussed below may be a limitation out of the total capacity of an individual storage device.

Master storage engine 410 may implement an online index generator 416 to incrementally index portions of a partition of a table to create a secondary index for the table. Prior to performing an indexing operation, online index generator 414 may check storage device(s) token bucket 412b and indexing operation bucket 412c. If attempts to obtain tokens from buckets 412b and 412c succeed, then the indexing operation may be performed and tokens deducted from buckets 412b and 412c. Indexing operations may include the various techniques discussed below with regard to FIG. 6. Online index generator may also generate and send indexing updates 442 to update secondary index 440 to include items identified for inclusion in secondary index 440 according to an indexing schema specified for the secondary index.

Both access handler 414 and online index generator 416 may generate/allow updates that are to be replicated 432 to peer storage engine(s) 420. Peer storage engine(s) 420 may implement an update handler 424 and respective storage device(s) token bucket 422. As replicated update(s) 432 are received, a token may be obtained from bucket 422 to perform the update by update handler 424. If no tokens remain the update(s) 432 may be throttled or denied. Stored update(s) may be acknowledged 434 back to master storage engine 434. In this way various consistency schemes, such as read and write quorums may be implemented to ensure that data is consistent across replica group members. In at least some embodiments, master storage engine 410 may maintain capacity information 418 for peer storage engine(s), such as token levels for partition storage device bucket 422, so that master storage engine can throttle requests that would fail to obtain a token at a peer replica, in some embodiments.

Figure 5:
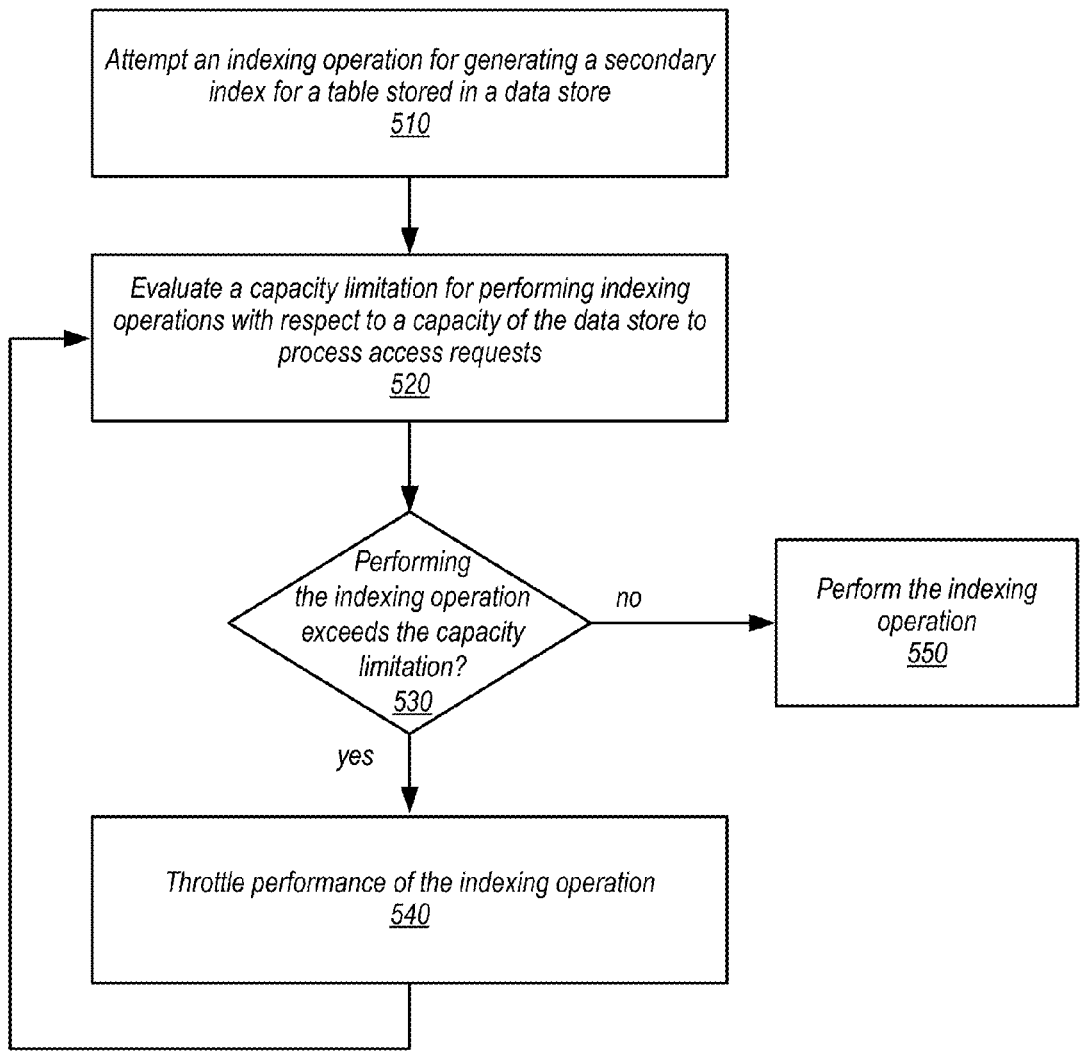
FIG. 5 is a high-level flowchart illustrating various methods and techniques to implement implicit prioritization to rate-limit secondary index creation for an online table, according to some embodiments.

The examples of implicit prioritization to rate-limit secondary index generation for online tables in a non-relational data store in FIGS. 2-4 have been given in regard to a data storage service (which may be a non-relational or NoSQL database service). However, various other types of data stores that may provide online generation of a secondary index may implement implicit prioritization to rate-limit secondary index generation for online tables, such as relational data stores (which may be distributed). FIG. 5 is a high-level flowchart illustrating various methods and techniques to implement implicit prioritization to rate-limit secondary index creation for an online table, according to some embodiments. These techniques may be implemented using one or storage nodes as described above with regard to FIGS. 2-4, as well as other databases, storage systems, and/or different implementations of a client and/or storage engine, and thus the following discussion is not intended to be limiting as to the other types or configurations of non-relational data stores that may implement the described techniques.

As indicated at 510, an indexing operation may be attempted as part of generating a secondary index for a table stored in a data store. The indexing operation, as discussed below with regard to FIG. 6, may be an operation that includes accessing the table (or data stored with or for the table) in order to identify items in the table which are to be included in a secondary index. A table scan may be performed, for instance, to read each item in a table to determine whether or not the item should be included in the secondary index. Each attempt to read an item may be an individual indexing operation. Similarly, items identified for inclusion in the secondary index may be written to a log, queue, or other storage location of table data in order to durably identify those items to be included in the secondary index. Thus, an indexing operation may include the write to the log.

Prior to performing the indexing operation, a capacity limitation for performing indexing operations may be evaluated with respect to a capacity of the data store to process access requests, as indicated at 520. Capacity of the data store to process access requests may be the capacity to process storage access requests to one or more storage devices (e.g., implemented in a RAID format) storing data for the table (which may include data values for table entries, items, attributes, or metadata about the table). Table data may be stored in various formats, such as a log that describes changes to table data or operations performed upon or with respect to table (e.g., indexing operations). In at least some embodiments, capacity of the data store to process access requests may be represented as Input/Output Operations per Second (IOPS). The one or more storage devices may store data for other table for other users in a multi-tenant storage scenario as discussed above.

A capacity limitation may be a maximum portion of the total capacity processing access requests which indexing operations may utilize. Note, that other operations utilize the total capacity, such as user access requests, which may or may not be limited. Thus, the capacity limitation may provide a ceiling on index operation performances—there is no guarantee that the indexing operation may be performed (as all available capacity may be utilized by other operations, some of which may have guaranteed portions of the total capacity, like provisioned or committed capacity for user access to the table as discussed below with regard to FIG. 8.)

The evaluation of the capacity limitation may verify whether the utilization of available capacity to perform the indexing operation is within the capacity limitation. For instance, as discussed below with regard to FIG. 7, an access token bucket may be implemented for indexing operations which limits the number of indexing operations that may be performed in a period of time. Another access token bucket may be implemented for capacity to process access requests at the data store. Verifying utilization of available capacity may therefore be attempting to obtain tokens from both buckets or determining that no tokens are available. If either one of the token buckets has no available tokens, then it may be determined that the utilization of the available capacity exceeds the capacity limitation.

If as indicated by the positive exit from 530, performance of the indexing operation exceeds the capacity limitation, then the performance of the indexing operation may be throttled, as indicated at 540. Throttling the indexing operation may delay the indexing operation until such a time as that the indexing operation may be performed without exceeding the capacity limitation. For example, an execution thread performing the indexing operation may suspend for a period of time and then re-evaluate the performance of the indexing operation with respect to the capacity limitation (as illustrated by the arrow back to element 520). If, as indicated by the negative exit from 530, performance of the indexing operation does not exceed the capacity limitation, then the indexing operation may be performed.

Tables in data stores may be partitioned. Thus, the techniques described above may be performed at multiple different partitions (e.g., at different storage hosts) to create the secondary index for the table. Respective capacity limits may be maintained for each partition (and/or replica of a partition) of the table. Secondary indexes may also be partitioned.

Figure 6:
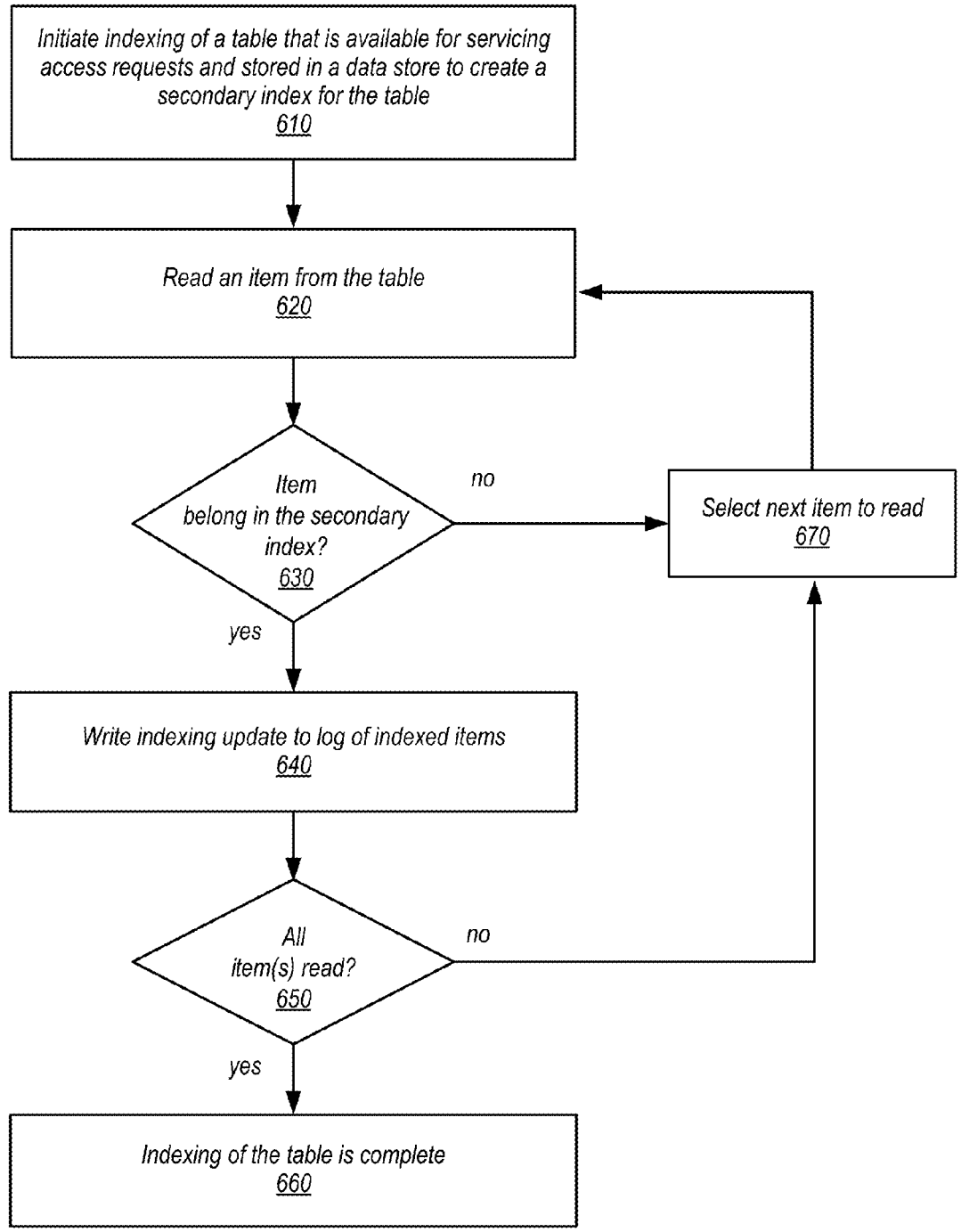
FIG. 6 is a high-level flowchart illustrating various methods and techniques to generate a secondary index, according to some embodiments.

Indexing operations may involve different types of access to a table in order to generate the secondary index. For example, indexing operations may be performed incrementally over a table. FIG. 6 is a high-level flowchart illustrating various methods and techniques to generate a secondary index, according to some embodiments.

Creation of a secondary index for a table stored in a non-relational data store may be performed while the table is online, available for servicing access requests to data stored in the table. Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified. Creation of the secondary index may be performed by initiating indexing of the table, in various embodiments, as indicated at 610.

Incremental indexing may index different portions of the table according to a determined indexing schema for the secondary index (as may be specified in the creation request noted above). For instance, different ranges of items (or item attribute values) may be evaluated in a contiguous order. An indexing operation may be an operation to read an item from the table, as indicated at 620. The data of the item (e.g., attribute values) may be evaluated according to the indexing schema. If, as indicated by the negative exit from 630, the item does not belong the secondary index, then a next item may be selected for reading, as indicated at 670 (e.g., according to the incremental indexing technique discussed above). If, however, the item does belong in the secondary index, then another indexing operation may be performed. For instance, as indicated at 640, the indexing update (to include the found item and attribute values specified by the indexing schema) may be written to a log of indexed items.

The log of indexed items may be later accessed so that the indexed items may be replicated out to the secondary index. In at least some embodiments, the log may be stored as part of table data at a storage device or stored at a different storage device (e.g., a dedicated log storage device). In some embodiments, log records may be replicated from the log to peer replicas (as discussed above with regard to FIG. 4). Log records may not be written or identified as durable or committed until acknowledgments that the replicas of the log record are stored durably at the peer replicas. Those peer replicas may also enforce capacity limitations for performing the write to a log, and thus, in some embodiments, evaluating the capacity limitation (as discussed above with regard to FIG. 5) may include determining whether the capacity limitation at any peer replica is exceeded (in addition to the replica performing the indexing operation, such as a master replica).

If all items are not read, as indicated by the negative exit from 650, then another item to read in the table may be selected, as indicated at 670. If all items of the table have been read, then indexing of the table may be considered completed, as indicated at 660.

Figure 7:
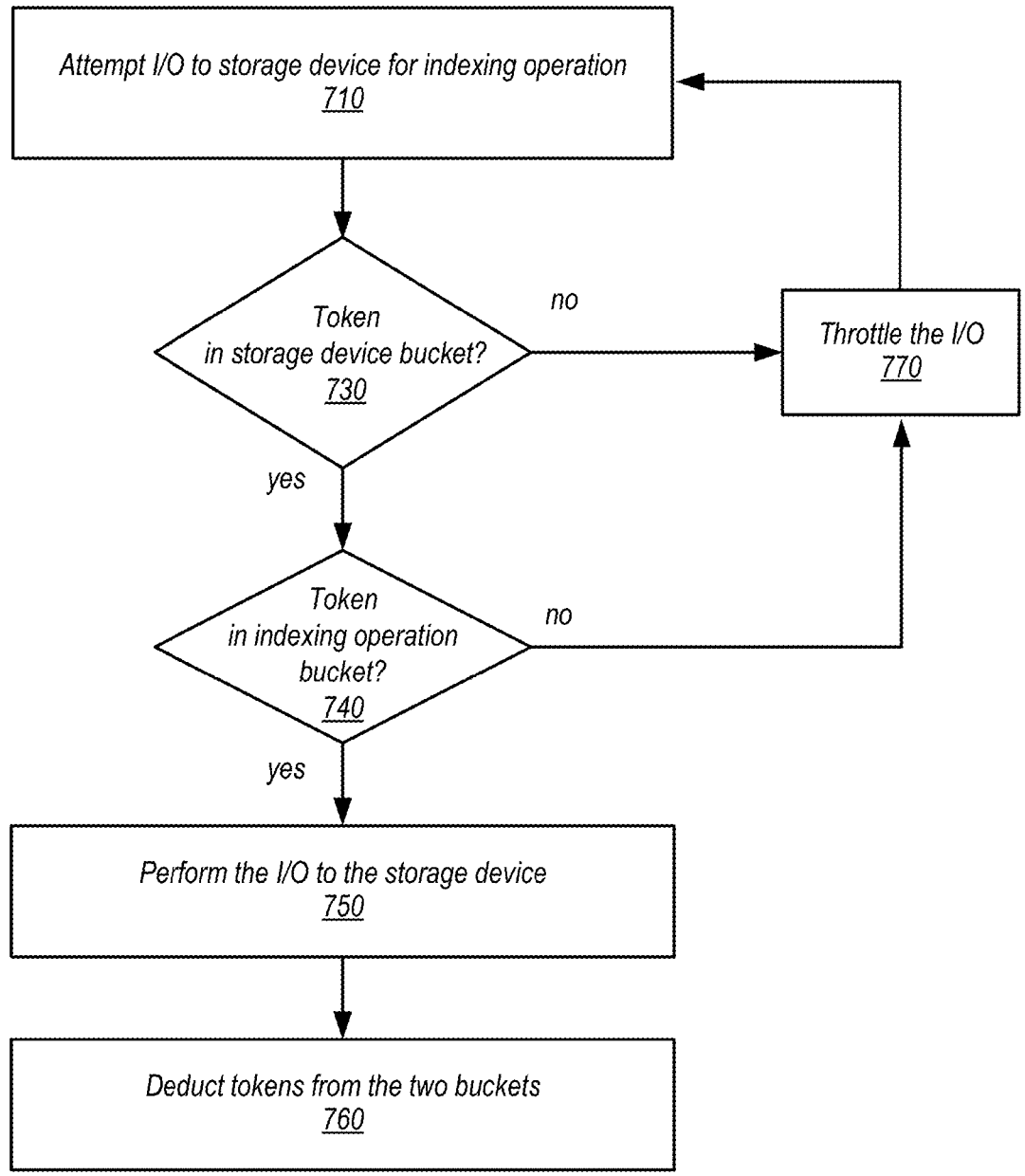
FIG. 7 is a high-level flowchart illustrating various methods and techniques evaluating a capacity limitation for performing indexing operations, according to some embodiments.

Capacity limitations may be enforced in different ways. For instance, some capacity limitations may be implemented by schedulers that manage a queue of attempts to access a table. In at least some embodiments, access token buckets (as discussed in FIG. 4 above) may be implemented to enforce a capacity limitation according to an account of access attempts to the table that have been allowed. FIG. 7 is a high-level flowchart illustrating various methods and techniques evaluating a capacity limitation for performing indexing operations, according to some embodiments.

As indicated at 710, an I/O operation (such as the I/O operations discussed above with regard to FIG. 6) may be attempted for an indexing operation, such as a request to read data from or write data to a storage device. An access token bucket may be maintained for the storage device (or multiple storage devices) storing data for the table. Access token buckets may be refilled (or reset) with a number of tokens after period of time. For example, an access token bucket may be refilled with 1000 tokens every second. Note that unused tokens may not carry over to a new period of time. Only those operations that obtain a token from the bucket may be granted access. Thus, in the above example, up to 1000 operations may be granted access every second. In the case of an access token bucket for a storage device, the refill rate may be determined based on the throughput capability of the storage device to handle I/O operations. For instance, if a storage device can process 2000 IOPS, then the refill rate for the access token bucket for the storage device may be 2000 tokens every second. As illustrated in FIG. 7, if a token cannot be obtained because no token is remaining, then as indicated by the negative exit from 730, the I/O for the indexing operation may be throttled, as indicated at 770.

Another access token bucket may be implemented for indexing operations in order to limit the capacity out of the total capacity that indexing operations may take. For instance, if, as in the example above, total capacity is 2000 IOPS for a storage device, then a capacity limitation for indexing operations that is a portion of the total capacity, such as 10%, may be represented by a corresponding refill rate for the access token bucket for performing indexing operations (e.g., 200 tokens every second). As illustrated at 740, an access token from the bucket for indexing operations may also need to be successfully obtained. Thus, even though available capacity may exist to perform the indexing operation (e.g., a token is available at 730), if no remaining tokens are available at 740, then as indicated by the negative exit from 740, the indexing operation may be throttled. In this way, indexing operations may not entirely consume capacity to access the table. Alternatively, if no tokens for storage device capacity exist 730, it may be that other operations (which may have implicitly higher priority and are not required to get both tokens) have consumed all of the capacity for accessing the table for the period.

For those indexing operations that obtain both an access token for the storage device and for indexing operations, as indicated by the positive exit from 740, the I/O may be performed to the storage device, as indicated at 750. Thus, the request to read the item or write to a log or other indexing generation structure may be allowed. As indicated at 760, tokens may be deducted from the two buckets, the access token bucket for the storage device and the access token bucket for indexing operations.

Figure 8:
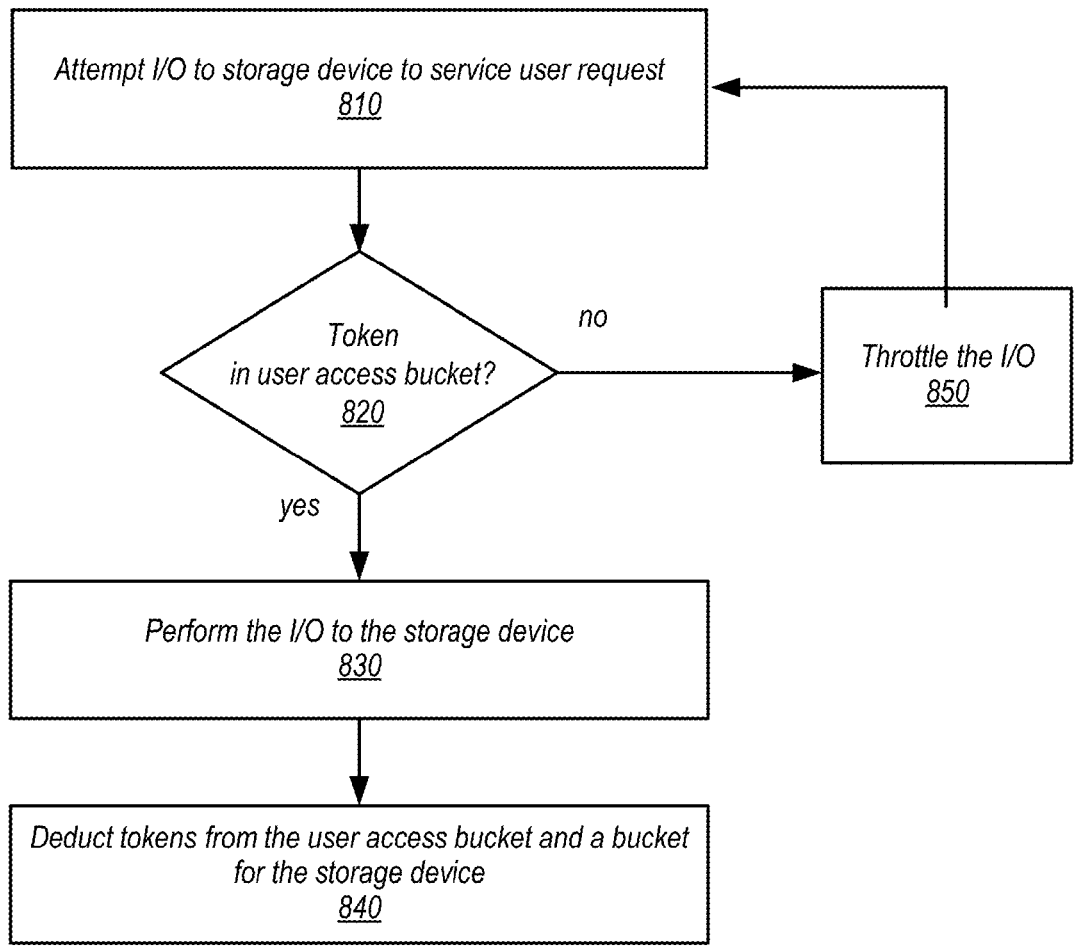
FIG. 8 is a high-level flowchart illustrating various methods and techniques to process an access request directed to a table from a user, according to various embodiments.

In at least some embodiments, the capacity to process access request directed to a table in the data store may be provisioned or committed to user access. For instance, a committed throughput level (e.g., defined in terms of IOPS) may be specified for a table in order to guarantee a particular level of throughput performance for accessing the table. The total capacity of the data store to process access requests to the table is also consumed by user access (in addition to indexing operations as discussed above). As user access may be considered a higher priority for table access, different techniques maybe implemented to ensure that provisioned or committed capacity to process access requests is provided. FIG. 8 is a high-level flowchart illustrating various methods and techniques to process an access request directed to a table from a user, according to various embodiments.

A request to access the table may be received from a user, in various embodiments. The request may, for instance, be a request to read, get, or otherwise retrieve data, or a request to write, change, or otherwise modify data in the table. In order to service the request, one or more I/O operations may be attempted to a storage device (e.g., a block-based persistent storage device, such as disc-based storage, flash-based storage, or other nonvolatile storage technologies) that stores data for the table, as indicated at 810. For example, a request to get particular attribute values for an item may result in a read I/O to retrieve the item from the persistent storage device in order to generate a response with requested data.

The I/O to service the request from the user is serviced out of the total capacity of the persistent storage device to service access requests. In at least some embodiments, an access token bucket may be maintained which is filled according to the provisioned or committed capacity for user access to the table. As with examples given above with regard to FIG. 7, the access token bucket may refill with a number of tokens representing the number of I/O operations that are allocated in a time period (e.g., 100 IOPS provisioned may result in the bucket being filled up to (or reset to) 100 tokens every second. If a token is available in the bucket for user access, then as indicated by the positive exit from 820, the I/O operation may be performed at the storage device, as indicated at 830. For instance, in the read example given above, the read operation to the particular portion of the storage device that stores the desired item may be performed in order to return the data of the item recorded in the storage device. Then, as indicated at 840, tokens may be deducted from the bucket for user access and a bucket maintained for the storage device (as described above with regard to FIG. 7). In this way an accounting the total capacity of the I/O operation is made by deducting the token (which may impact whether an indexing operation or other operation may have a token to obtain from the storage device access token bucket) from the bucket of the total capacity of the storage device.

As indicated by the negative exit from 820, if no token is in the bucket for user access, then the I/O for the use request may be throttled, as indicated at 850. For instance, the I/O request may be delayed for a period of time and then a new attempt to perform the I/O may be made (as illustrated in FIG. 8). Alternatively, the I/O may be performed after a delay period with regard to the user access token bucket. In at least some embodiments, a burst allowance may be implemented to utilize some of the total capacity for the storage device to service access requests from users that exceed the tokens (and thus the provisioned capacity).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
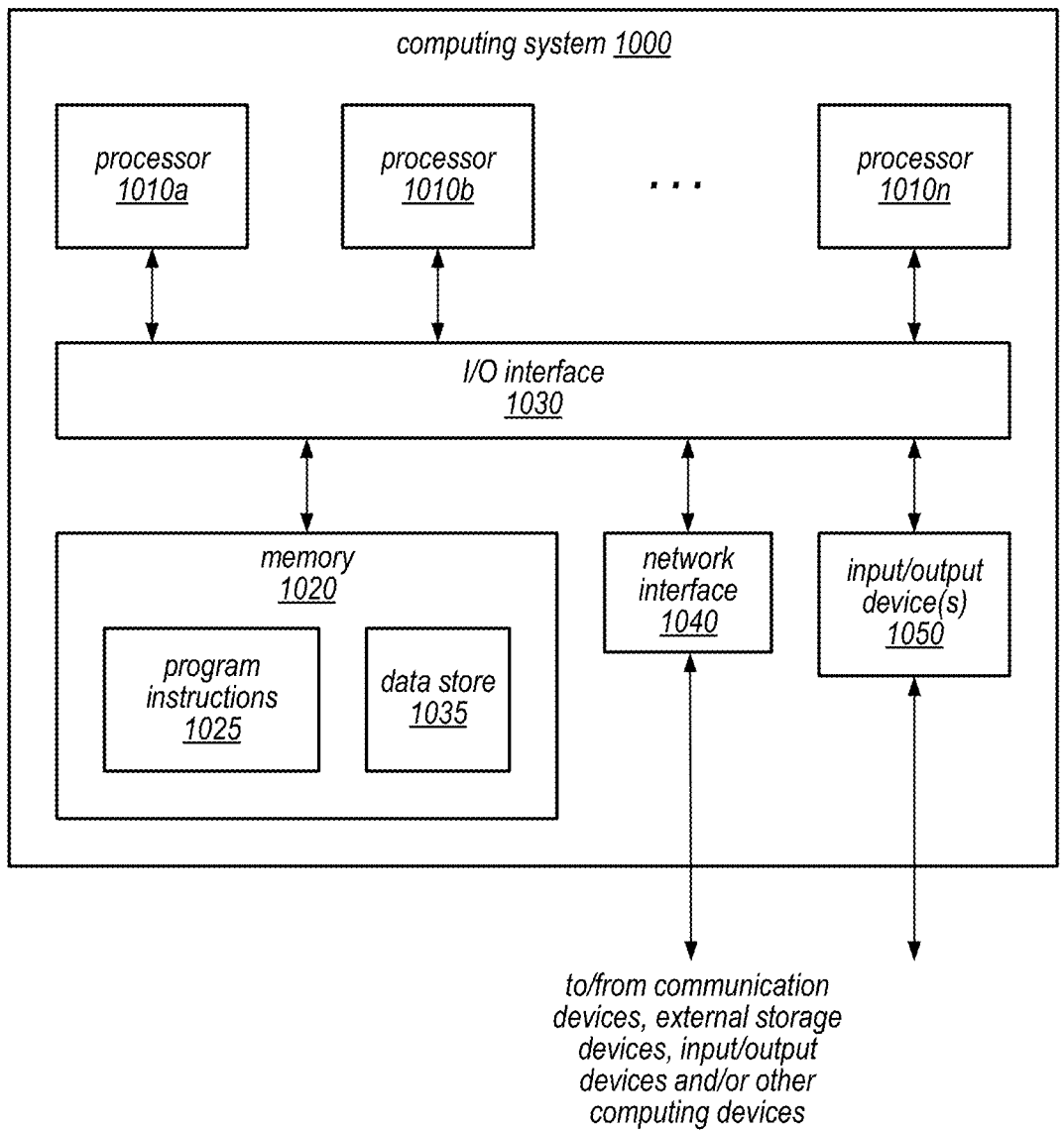
FIG. 9 is a block diagram illustrating an example computing system, according to some embodiments.

Embodiments of implicit prioritization to rate-limit secondary index generation for an online table as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor;
   a memory, storing program instructions that when executed by the at least one processor cause the at least one processor to implement a storage host for a data store;
   the storage host, configured to:
      receive a request to create a secondary index for a table stored in the data store, wherein the table is available for servicing access requests using a primary key, and wherein the secondary index provides an alternative access schema for the table in addition to the primary key;
      in response to receipt of the request, incrementally perform a plurality of indexing operations to create the secondary index while the table remains available for servicing access requests using the primary key, wherein to incrementally perform the indexing operations, the storage engine is configured to:
         prior to performance of individual ones of the indexing operations:
            verify that utilization of available capacity to perform the indexing operation is within a capacity limitation for performance of the indexing operations, wherein the capacity limitation is a portion of a total capacity of a storage device that stores at least a portion of the table to process access requests directed to the storage device;
            in response to a determination that the utilization of the available capacity to perform the indexing operation exceeds the capacity limitation, throttle performance of the indexing operation; and
         wherein at least one of the indexing operations is throttled.

2. The system of claim 1,
   wherein the storage host is further configured to maintain an access token bucket for the total capacity of the storage device to process access requests directed to the storage device and an access token bucket for the capacity limitation for performance of the indexing operations;
   wherein to verify that the utilization of available capacity to perform the indexing operation is within the capacity limitation, the storage host is configured to attempt to obtain an access token for the indexing operation from the access token bucket for the capacity of the storage device and the access token bucket for the capacity limitation; and
   wherein to determine that the utilization of the available capacity to perform the indexing operation exceeds the capacity limitation, the storage host is configured to detect at least one of:
      a failure to obtain the access token from the access token bucket for the capacity of the storage device; or
      a failure to obtain the access token bucket for the capacity limitation.

3. The system of claim 2, wherein the storage host is further configured to:
   maintain an access token bucket for user access to the table;
   during the generation of the secondary index:
      receive an access request directed to the table from a user;
      attempt to obtain an access token from the access token bucket for user access to the table;
      in response to obtainment of the access token from the access token bucket for user access to the table:
         perform the access request; and
         deduct an access token from the access token bucket for the total capacity of the storage device to process access requests directed to the table.

4. The system of claim 1, wherein the data store is a non-relational data storage service, wherein the table is associated with a customer account of the non-relational data storage service, and wherein the storage host is a multi-tenant storage host that stores data for at least a portion of one or more other tables associated with different customer accounts of the network-based storage service at the storage device.

5. A method, comprising:
performing, by one or more computing devices:
performing a plurality of indexing operations to generate a secondary index for a table stored in a data store, wherein the table is available for servicing access requests using a primary key, and wherein the secondary index provides an alternative access schema for the table in addition to the primary key, performing the plurality of indexing operations comprising:
prior to performing at least one indexing operation:
evaluating a capacity limitation for performing the indexing operations with respect to a capacity of the data store to process access requests;
determining, according to the evaluation, that performing the at least one indexing operation exceeds the capacity limitation; and
in response to determining that performing the at least one indexing operation exceeds the capacity limitation, throttling performance of the at least one indexing operation.

6. The method of claim 5,
wherein the method further comprises maintaining an access token bucket for the capacity of the data store to process access requests and an access token bucket for the capacity limitation for performing the indexing operations;
wherein the evaluating the capacity limitation for performing the indexing operations with respect to the capacity of the data store comprises attempting to obtain an access token for the at least one indexing operation from the access token bucket for the capacity of the data store and the access token bucket for the capacity limitation; and
wherein determining that performing the at least one indexing operation exceeds the capacity limitation comprises detecting at least one of:
a failure to obtain the access token from the access token bucket for the capacity of the data store; or
a failure to obtain the access token bucket for the capacity limitation.

7. The method of claim 6, further comprising:
maintaining an access token bucket for user access to the table;
during the generating of the secondary index:
receiving an access request directed to the table from a user;
attempting to obtain an access token from the access token bucket for user access to the table;
in response to obtaining the access token from the access token bucket for user access to the table:
performing the access request; and
deducting an access token from the access token bucket for the capacity of the data store to process access requests.

8. The method of claim 5, wherein the method further comprises:
prior to performing at least one other indexing operation:
evaluating the capacity limitation for performing the indexing operations with respect to the capacity;
determining, according to the evaluation, that performing the at least one other indexing operation does not exceed the capacity limitation; and in response to determining that performing the at least one other indexing operation does not exceed the capacity limitation, performing the at least one other indexing operation.

9. The method of claim 8,
wherein the method further comprises maintaining an access token bucket for the capacity of the data store to process access requests and an access token bucket for the capacity limitation for performing the indexing operations;
wherein the evaluating the capacity limitation for performing the indexing operations with respect to the capacity of the data store comprises attempting to obtain an access token for the at least one other indexing operation from the access token bucket for the capacity of the data store and the access token bucket for the capacity limitation; and
wherein determining that performing the at least one other indexing operation exceeds the capacity limitation comprises obtaining:
the access token from the access token bucket for the capacity of the data store; and
the access token bucket for the capacity limitation.

10. The method of claim 5, wherein the evaluating the capacity limitation for performing the indexing operations comprises:
verifying utilization of available capacity at a master replica to perform the indexing operation with respect to capacity of one or more storage devices at the master replica to process access requests; and
verifying utilization of available capacity at one or more peer replicas to perform the indexing operation with respect to capacity of one or more storage devices at the one or more peer replicas to process access requests.

11. The method of claim 5, wherein the indexing operation is an Input/Output (I/O) operation to write to a storage device storing at least a portion of the table.

12. The method of claim 5, wherein the data store is a network-based storage service, wherein the performing the plurality of secondary index operations, the evaluating the capacity limitation, the determining that the capacity limitation is exceeded, and the throttling the at least one indexing operation are performed in response to a request to create the secondary index received via a network-based interface for the network-based storage service.

13. The method of claim 12, wherein the performing the plurality of secondary index operations, the evaluating the capacity limitation, the determining that the capacity limitation is exceeded, and the throttling the at least one indexing operation are performed at a multi-tenant storage host of the network-based storage service storing data for at least a portion of the table, wherein the table is associated with a customer account of the network-based storage service, wherein the storage host stores data for at least a portion of one or more other tables associated with different customer accounts of the network-based storage service, and wherein the method further comprises:
in response to receiving a request to generate a secondary index for one of the other tables, migrating the data for at least the portion of the other table to a different storage host.

14. A non-transitory, computer-readable storage medium, storing program instructions that when executed by one or more computing devices cause the one or more computing devices to implement:
performing a plurality of indexing operations to generate a secondary index for a table stored in a data store, wherein the table is available for servicing access requests using a primary key, and wherein the secondary index provides an alternative access schema for the table in addition to the primary key, performing the plurality of indexing operations comprising:

prior to performing at least one indexing operation:
verifying that utilization of available capacity to perform the at least one indexing operation is within a capacity limitation for performance of the indexing operations, wherein the capacity limitation is a portion of a total capacity of the data store to process access requests;

determining, according to the verification, that the utilization of the available capacity to perform the at least one indexing operation exceeds the capacity limitation; and in response to determining that the utilization of the available capacity to perform the indexing operation exceeds the capacity limitation, throttling performance of the at least one indexing operation.

15. The non-transitory, computer-readable storage medium of claim 14, wherein the programming instructions cause the one or more computing devices to further implement maintaining an access token bucket for the capacity of the data store to process access requests and an access token bucket for the capacity limitation for performing the indexing operations;

wherein, in the verifying that the utilization of available capacity to perform the at least one indexing operation is within the capacity limitation, the programming instructions cause the one or more computing devices to implement attempting to obtain an access token for the indexing operation from the access token bucket for the capacity of the data store and the access token bucket for the capacity limitation; and wherein, in determining that the utilization of the available capacity to perform the at least one indexing operation exceeds the capacity limitation, the programming instructions cause the one or more computing devices to implement detecting at least one of:
a failure to obtain the access token from the access token bucket for the capacity of the data store; or
a failure to obtain the access token bucket for the capacity limitation.

16. The non-transitory, computer-readable storage medium of claim 15, wherein the program instructions cause the one or more computing devices to further implement:

maintaining an access token bucket for user access to the table;

during the generating of the secondary index:
receiving an access request directed to the table from a user;
attempting to obtain an access token from the access token bucket for user access to the table;
in response to obtaining the access token from the access token bucket for user access to the table:
performing the access request; and
deducting an access token from the access token bucket for the capacity of the data store.

17. The non-transitory, computer-readable storage medium of claim 14, wherein the program instructions cause the one or more computing devices to further implement:

prior to performing at least one other indexing operation:
verifying that the utilization of available capacity to perform the at least one other indexing operation is within the capacity limitation;

determining, according to the verification, that the utilization of the available capacity to perform the at least one other indexing operation does not exceed the capacity limitation; and in response to determining that the utilization of the available capacity to perform the indexing operation does not exceed the capacity limitation, performing the at least one other indexing operation.

18. The non-transitory, computer-readable storage medium of claim 14, wherein the capacity of the data store is the capacity of is total Input/Output Operations per Second (IOPS) capability of one or more storage devices storing at least a portion of the table.

19. The non-transitory, computer-readable storage medium of claim 14, wherein the indexing operation is an Input/Output (I/O) operation to read from a persistent storage device storing at least a portion of the table.

20. The non-transitory, computer-readable storage medium of claim 14, wherein the data store is a network-based storage service, wherein the performing the plurality of secondary index operations, the verifying the utilization of the available capacity, the determining that the capacity limitation is exceeded, and the throttling the at least one indexing operation are performed in response to a request to create the secondary index received via a network-based interface for the network-based storage service.

* * * * *